United States Patent
Tomono et al.

(10) Patent No.: US 9,286,305 B2
(45) Date of Patent: Mar. 15, 2016

(54) VIRTUAL STORAGE GATE SYSTEM

(71) Applicant: FUJITSU LIMITED, Kawasaki-shi, Kanagawa (JP)

(72) Inventors: Mitsuru Tomono, San Jose, CA (US); Hiroshi Michishita, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 105 days.

(21) Appl. No.: 13/830,214

(22) Filed: Mar. 14, 2013

(65) Prior Publication Data

US 2014/0279887 A1    Sep. 18, 2014

(51) Int. Cl.
  *G06F 17/30* (2006.01)

(52) U.S. Cl.
  CPC .... *G06F 17/30094* (2013.01); *G06F 17/30233* (2013.01)

(58) Field of Classification Search
  None
  See application file for complete search history.

(56) References Cited

U.S. PATENT DOCUMENTS

| | | | |
|---|---|---|---|
| 2002/0046232 A1 | 4/2002 | Adams et al. | |
| 2003/0115145 A1* | 6/2003 | Lee et al. | 705/54 |
| 2004/0088288 A1 | 5/2004 | Pasupathy et al. | |
| 2004/0122958 A1 | 6/2004 | Wardrop | |
| 2006/0036602 A1 | 2/2006 | Unangst et al. | |
| 2009/0328151 A1 | 12/2009 | Tamura et al. | |
| 2010/0114889 A1* | 5/2010 | Rabii et al. | 707/737 |
| 2013/0262385 A1* | 10/2013 | Kumarasamy et al. | 707/634 |
| 2014/0279983 A1* | 9/2014 | Benjamin-Deckert et al. | 707/696 |
| 2015/0222604 A1* | 8/2015 | Ylonen | H04L 63/062 713/171 |

FOREIGN PATENT DOCUMENTS

WO    2007/035653 A2    3/2007

OTHER PUBLICATIONS

European Search Report date of search Jul. 25, 2014 application No. GB1404161.0.
GB Search Report dated Jun. 12, 2015 as received in Application No. GB1404161.0.

* cited by examiner

*Primary Examiner* — Rehana Perveen
*Assistant Examiner* — Raheem Hoffler
(74) *Attorney, Agent, or Firm* — Maschoff Brennan (57) ABSTRACT

An example embodiment includes a distributed file management system. The distributed file management system includes a central storage device that is communicatively coupled to data repositories configured to store one or more files. The central storage device includes a processor and a tangible computer-readable storage medium. The tangible computer-readable storage medium is communicatively coupled to the processor and has computer-executable instructions stored thereon that are executable by the processor to perform operations. The operations include receiving file access requests from the data repositories. The operations also include transmitting location information of files requested in the file access requests. The location information includes internet protocol (IP) addresses of the data repositories on which the files are stored. The operations also include receiving updated file indices from the data repositories indicating remote access to files and updating a central access log and a central file index to include the updated file indices.

20 Claims, 6 Drawing Sheets

VIRTUAL STORAGE GATE SYSTEM

FIELD

The embodiments discussed herein are related to a virtual storage gate system.

BACKGROUND

Users often have files such as pictures, videos, and documents scattered across multiple data repositories such as servers, cloud storage networks, smartphones, tablet personal computers, digital cameras, etc. In this environment, management of these files is inefficient and inconvenient. Users want access to the files stored on any of the data repositories, but do not organize the files accordingly. Thus, the user's access to the files is limited.

Use of a cloud storage network attempts to solve this problem. In some cloud storage networks, the user stores and/or copies the files to the cloud storage network. To access the files on the cloud storage network, the user connects with the cloud storage network from a device and opens one of the files. However, use of cloud storage networks typically involves duplication of the files and/or transfer of the files to the cloud storage network. This step may be significant because sources of the files are scattered and the devices vary in capability to communicate with the cloud storage network. Thus, in cloud storage networks, files are unnecessarily moved and duplicated.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a system includes a distributed file management system. The distributed file management system includes a central storage device that is communicatively coupled to data repositories that are configured to store one or more files. The central storage device includes a processor and a tangible computer-readable storage medium. The tangible computer-readable medium is communicatively coupled to the processor and has computer-executable instructions stored thereon that are executable by the processor to perform operations. The operations include receiving file access requests from the data repositories. The operations also include transmitting location information of files requested in the file access requests. The location information includes internet protocol (IP) addresses of the data repositories on which the files are stored. The operations also include receiving updated file indices from the data repositories indicating remote access to files and updating a central access log and a central file index to include the updated file indices.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

An example embodiment includes a distributed file management system. The distributed file management system includes a central storage device communicatively coupled to multiple data repositories. The central storage device is configured to receive file access requests from any of the data repositories, to authenticate the data repository, and to transmit to the data repository location information of another data repository on which a file requested in the file access request is stored. The data repositories are configured to store one or more files, to receive the location information from the central storage device, and based on the location information, to remotely access the file requested in the file access request stored on the other data repository. Some additional embodiments of the present invention will be explained with reference to the accompanying drawings.

Figure 1A:
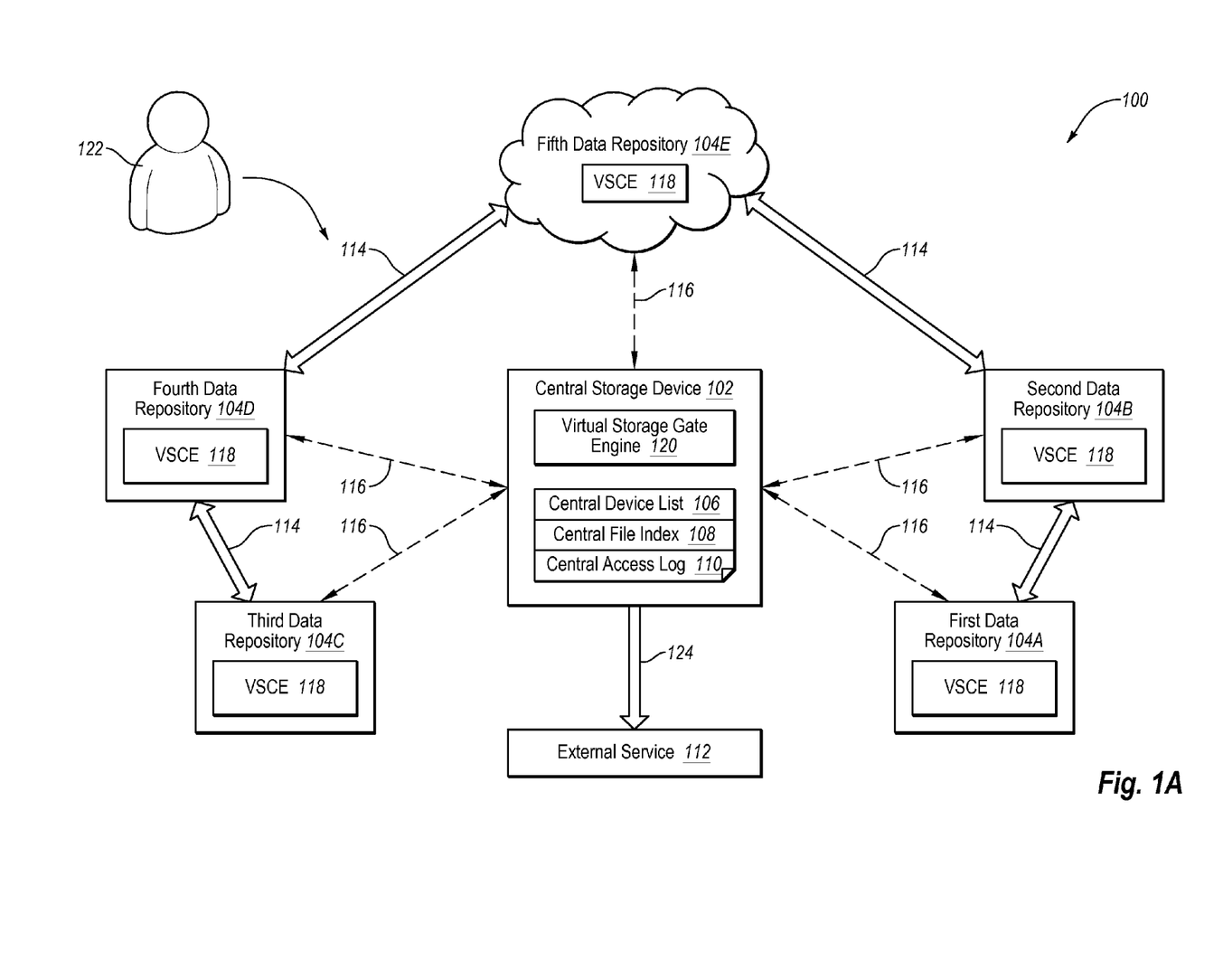
FIGS. 1A and 1B illustrate block diagrams of an example distributed file management system in which some embodiments may be implemented.
Figure 1B:
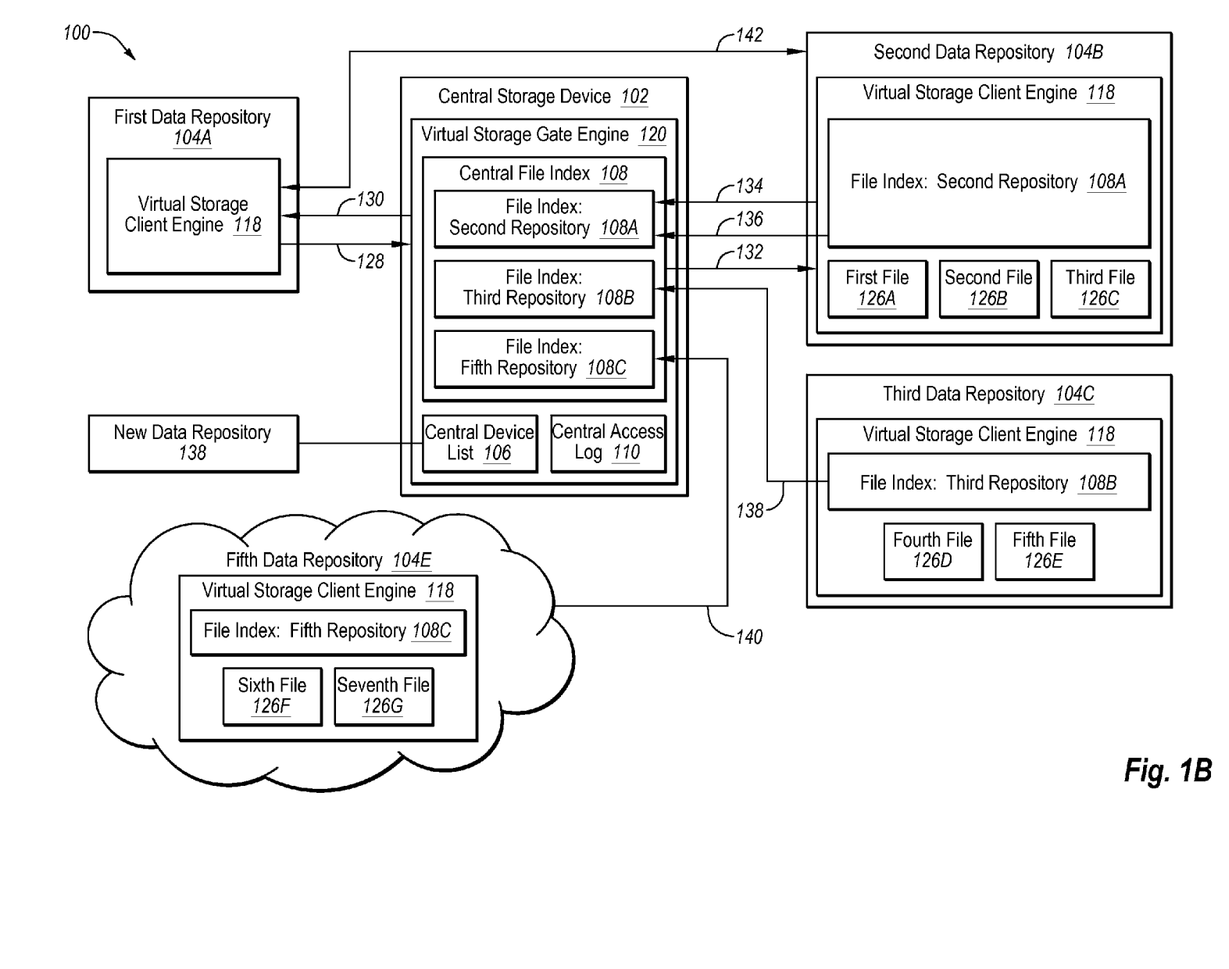

FIGS. 1A and 1B illustrate block diagrams of an example distributed file management system 100. Generally, the distributed file management system 100 enables remote access to files stored in multiple data repositories 104A-104E (generally, data repository or data repositories 104). The data repositories 104 may be distributed in various locations, or some may be in the same or similar locations. The distributed file management system 100 also tracks locations of the files (i.e., on which of the data repositories 104 the file is stored) and tracks remote access to the files.

With reference to FIG. 1A, in some embodiments, the distributed file management system 100 may be implemented for one or more users 122 to enable remote access to files of the user 122 that are stored on the data repositories 104 associated with the user 122. When remotely accessed, the files are deployed, visible, and/or modifiable on the data repository 104 operated by the user 122. For example, the user 122 may have multiple data repositories 104 such as mobile devices, home personal computers, cameras, etc. Each of the data repositories 104 may be configured to store files such as documents, photos, video, etc. The user 122 may use the distributed file management system 100 to access the files stored on any of the data repositories 104 from any other of the data repositories 104. Thus, using the distributed file management system 100, the user 122 may operate a first data repository 104A and remotely access the files stored on any of the other data repositories 104. Of course, the user 122 may also access the files that are stored locally at the first data repository 104A.

By enabling remote access, the distributed file management system 100 enables convenient access to all files scattered throughout the data repositories 104. Additionally, the distributed file management system 100 reduces the cost of redundant data storage.

The distributed file management system 100 includes a central storage device 102 communicatively coupled to the data repositories 104. The central storage device 102 stores and communicates information pertaining to the distributed file management system 100 to enable central management of the data repositories 104 and files stored thereon.

For example, information pertaining to the distributed file management system 100 may include file information of the files stored in the data repositories 104. The file information may be stored in a central file index 108, a central device list 106, and a central access log 110. The file information may include, but is not limited to, a unique key, a file name, an explorer attribute, an access frequency, an access repository, an original file key, an original repository name, and location information. The file information may be stored for each of the files stored on each of the data repositories 104, for only some of the files, or only some of the file information may be stored for some files while other file information is stored for other files, or any combination thereof. As files are transferred and remotely accessed by the central file index 108, the central access log 110, and the central device list 106 may be updated. The central storage device 102 may include, but is not limited to, a server, a group of servers, or another suitable storage device.

Additionally, the central storage device 102 may store repository information. The repository information may be stored in the central device list 106. The repository information may include, but is not limited to, network addresses for each of the data repositories 104, a list of files stored on each of the data repositories 104, and the type of each data repository 104. As new data repositories 104 are added to and/or removed from the distributed file management system 100, and as files are transferred throughout the distributed file management system 100, the central device list 106 may be updated.

Additionally, the central storage device 102 may store historical file access patterns and/or file access requests. The historical file access patterns and/or the file access requests may include which of the data repositories 104 requested access to a particular file and a frequency or a number of such requests, for instance.

The historical file access patterns and/or the file access requests may be stored in a central access log 110 and may be communicated to the central file index 108. As data repositories 104 communicate file access requests, the central access log 110 and/or the central file index 108 may be updated. Some additional details of the central access log 110, the central device list 106, and the central file index 108 are discussed with reference to FIGS. 1B and 2.

As mentioned above, the central storage device 102 may be communicatively coupled to the data repositories 104. Alternately or additionally, the data repositories 104 may be communicatively coupled to one another. Thus, between each of the data repositories 104 and the central storage device 102 there may be a network connection, and between each of the data repositories 104 and every other data repository 104 there may be a network connection. In FIG. 1A, the network connection between the data repositories 104 are represented by arrows 114, and the network connection between the central storage device 102 and the data repositories 104 are represented by dashed arrows 116. In FIG. 1A, the network connections 114 between some of the data repositories 104 are not shown. However, each of the data repositories 104 may communicate with every other data repository 104 and/or with only some of the other data repositories 104.

The network connections 114 and 116 may include, but are not limited to, network connections established or maintained by any wired or wireless network technology such as optical fiber, electrical cables, Ethernet, radio wave, microwaves, infrared transmission, wireless internet, communication satellites, cellular telephone signals, or an equivalent networking signal that interfaces with devices to create a network.

In some circumstances, the network connection 114 between one or more of the data repositories 104 is different from the network connection 116 between the central storage device 102 and one or more of the data repositories 104. Selection of the type of network connections 114 and 116 may be based upon availability of the network facilities (e.g., Wi-Fi access point, cellular signal, etc.), physical locations of the data repositories 104, the types of the data repositories 104, a similar factor, or any combination thereof.

In FIG. 1A, for instance, a fifth data repository 104E includes a cloud storage network. Accordingly, the network connection 114 between a second data repository 104B and the fifth data repository 104E may include a Wi-Fi network connection. Alternatively, the second data repository 104B may be a mobile phone and the first data repository 104A may be a tablet personal computer with LTE capabilities. Accordingly, the network connection 114 between the first data repository 104A and the second data repository 104B may be an LTE network connection. Likewise, the network connection 116 between the central storage device 102 and the fifth data repository 104E may be a Wi-Fi network connection while the network connection 116 between the central storage device 102 and the first data repository 104A may be an LTE network connection. The foregoing are provided by way of example only and not by way of limitation.

Some examples of the data repositories 104 may include, but are not limited to, mobile devices, smartphones, tablet personal computers, cameras, cloud storage networks, or any other suitable storage device. The distributed file management system 100 includes five data repositories 104; however, some embodiments include more than five or fewer than five data repositories 104. In some embodiments, the distributed file management system 100 may enable inclusion of a specific number of data repositories 104 for a first fee and more than the specific number for a second fee. For example, up to and including five data repositories 104 may be free, but six or more data repositories 104 may cost ten dollars a month.

The central storage device 102 may include hardware and/or software arranged to perform one or more of the functions disclosed herein. Additionally, the data repositories 104 may include hardware and/or software arranged to perform one or more of the functions disclosed herein. In some embodiments, the central storage device 102 includes a virtual storage gate engine (VSGE) 120. In these and other embodiments, the VSGE 120 interfaces with a virtual storage client engine (VSCE) 118 loaded on the data repositories 104 to enable the data repositories 104 to remotely access files on other data repositories 104. For example, the VSCE 118 may be a daemon program that directs file access among the data repositories 104 through the VSGE 120. Some additional details of the VSCE 118 and the VSGE 120 are provided below.

In some embodiments, an external service 112 may harvest information stored on the central storage device 102. The harvesting of information from the central storage device 102 by the external service 112 is represented in FIG. 1A with arrow 124.

FIG. 1B illustrates an example remote file access process and example updating process in the distributed file management system 100 of FIG. 1A. In particular, FIG. 1B illustrates a file access request communicated by the first data repository 104A for a first file 126A stored on the second data repository 104B. Additionally, FIG. 1B illustrates an updating process of local file indices 108A-108C with the central storage device 102.

FIG. 1B illustrates a simplified version of the distributed file management system 100 of FIG. 1A. Specifically, in FIG. 1B, some components and arrows from FIG. 1A (e.g., 104D, 112, 114, 116, 120, 122, and 124) have been omitted. Accordingly, embodiments of the remote file access process and the updating process may be carried out in the distributed file management system 100 illustrated in FIG. 1A.

In this and other embodiments, the first data repository 104A, the second data repository 104B, the third data repository 104C, and the fifth data repository 104E have loaded thereon the VSCE 118 as discussed above. Likewise, the central storage device 102 has loaded thereon the VSGE 120 discussed above. The VSGE 120 and the VSCE 118 direct communications and file transfers between the data repositories 104 and between the data repositories 104 and the central storage device 102.

To remotely access the first file 126A, the first data repository 104A communicates a file access request to the central storage device 102. The file access request is represented in FIG. 1B by arrow 128. The file access request identifies the first file 126A, but does not identify the data repositories 104 on which the first file 126A is stored. Additionally, the file access request may include authentication information pertaining to the first data repository 104A.

The central storage device 102 receives the file access request for the first file 126A. The central storage device 102 may then authenticate the first data repository 104A. For example, the central storage device 102 may verify that the first data repository 104A is one of the data repositories 104 included in the distributed file management system 100 or that the first data repository 104A is associated with a user.

The central storage device 102 may then retrieve location information of the first file 126A from the central file index 108 and/or the central device list 106. The location information may include a network address such as an internet protocol (IP) address of the second data repository 104B on which the first file 126A is stored. Additionally, the central storage device 102 may retrieve authentication information pertaining to the first data repository 104A and the second data repository 104B. The authentication information pertaining to the first data repository 104A and the second data repository 104B may include information indicating that the first data repository 104A and/or the second data repository 104B are included in a distributed file management system 100 or associated with a user.

The central storage device 102 may transmit authentication information of the first data repository 104A to the second data repository 104B, authentication information of the second data repository 104B to the first data repository 104A, and the location information of the second data repository 104B to the first data repository 104A. Transmission of the authentication information of the second data repository 104B and the location information of the first data repository 104A is represented in FIG. 1B by arrow 130. Transmission of the authentication information of the first data repository 104A to the second data repository 104B is represented in FIG. 1B by arrow 132.

Transmitting the authentication information to the first and second data repositories 104A and 104B may provide assurances and security to a user. For example, before allowing remote access to the first file 126A, the first and second data repositories 104A and 104B may be assured that the first file 126A is the correct file, the first and second data repositories 104A and 104B are secured devices, and the remote access will not introduce vulnerabilities, such as a virus, into the distributed file management system 100.

The first data repository 104A receives the authentication information of a second data repository 104B on which the first file 126A is stored. Using the location information transmitted by the central storage device 102, the first data repository 104A may remotely access the first file 126A. Remote access to the first file 126A by the first data repository 104A is represented in FIG. 1B by arrow 142.

With combined reference to FIGS. 1A and 1B, the first data repository 104A may remotely access the first file 126A from the second data repository 104B via the network connection 114. The network connection 114 over which the first file 126A is remotely accessed may be the same or different from the network connection 116 over which the file access request is communicated to the central storage device 102.

In some embodiments, the first data repository 104A is configured to detect an efficient file access method. The efficient access method may include identifying a particular network connection over which a file may be accessed or a file access request may be communicated. The efficient access method may further include setting bitrates for a file access, setting a file format, etc. When detecting the efficient file access method, the first data repository 104A may analyze the availability of the network facilities (e.g., Wi-Fi access point, cellular signal, etc.), physical locations of the data repositories 104, the types of the data repositories 104, a similar factor, or any combination thereof. Based on one or more of the factors, the first data repository 104A may then remotely access the first file 126A from the second data repository 104B according to the efficient file access method. For example, the file may be accessed via an identified network connection, at a specific bitrate, etc.

FIG. 1B also illustrates an addition of a new data repository 138. The new data repository 138 may be substantially similar to the data repositories 104. A user of the distributed file management system 100 may register the new data repository 138. For example, the user may load the VSCE 118 to the new data repository 138. The new data repository 138 may then communicate a registration to the central storage device 102. In embodiments including the VSCE 118, the registration may be communicated to the VSGE 120.

The central storage device 102 may receive the registration of the new data repository 138. The central storage device 102 may then loop through each of the data repositories 104 and update the central device list 106 to include the new data repository 138. As a part of the update to the central device list 106, the central storage device 102 may integrate file information of one or more files stored on the new data repository 138 into the central file index 108.

As mentioned above, the central storage device 102 includes the central access log 110. Additionally, the VSCES 118 include local file indices 108A, 108B, and 108C. Following the remote access by the first data repository 104A to the first file 126A, a second repository file index 108A may be updated indicating that the first file 126A was accessed on the second data repository 104B by the first data repository 104A. The second data repository 104B may then communicate the updated second repository file index 108A to the central storage device 102. At the central storage device 102, the central access log 110 may be updated to reflect that the first file 126A was accessed on the second data repository 104B by the first data repository 104A.

Additionally or alternatively, one or more of the data repositories 104 may be periodically synchronized with the central storage device 102 at a predetermined interval or a random interval. For example, the second data repository 104B, the third data repository 104C, and the fifth data repository 104E may communicate a second repository file index 108A, a third repository file index 108B, and the fifth repository file index 108C to the central storage device 102 every twenty-four hours, or when requested by the central storage device 102, or any combination thereof. Communication of the second repository file index 108A, the third repository file index 108B, and the fifth repository file index 108C to the central storage device 102 is represented in FIG. 1B by arrows 136, 138, and 140. The central access log 110, the central file index 108, the central device list 106, or some combination thereof may be updated to reflect changes in the second repository file index 108A, the third repository file index 108B, and the fifth repository file index 108C.

In some embodiments, during remote access to the first file 126A, the central file index 108, the central access log 110, and/or the central device list 106 may be locked. The communication to lock the central file index 108 is represented in FIG. 1B by arrow 134. By locking the central file index 108, the central access log 110, and/or the central device list 106, updating the central file index 108 may be delayed until the remote access is complete.

Figure 2:
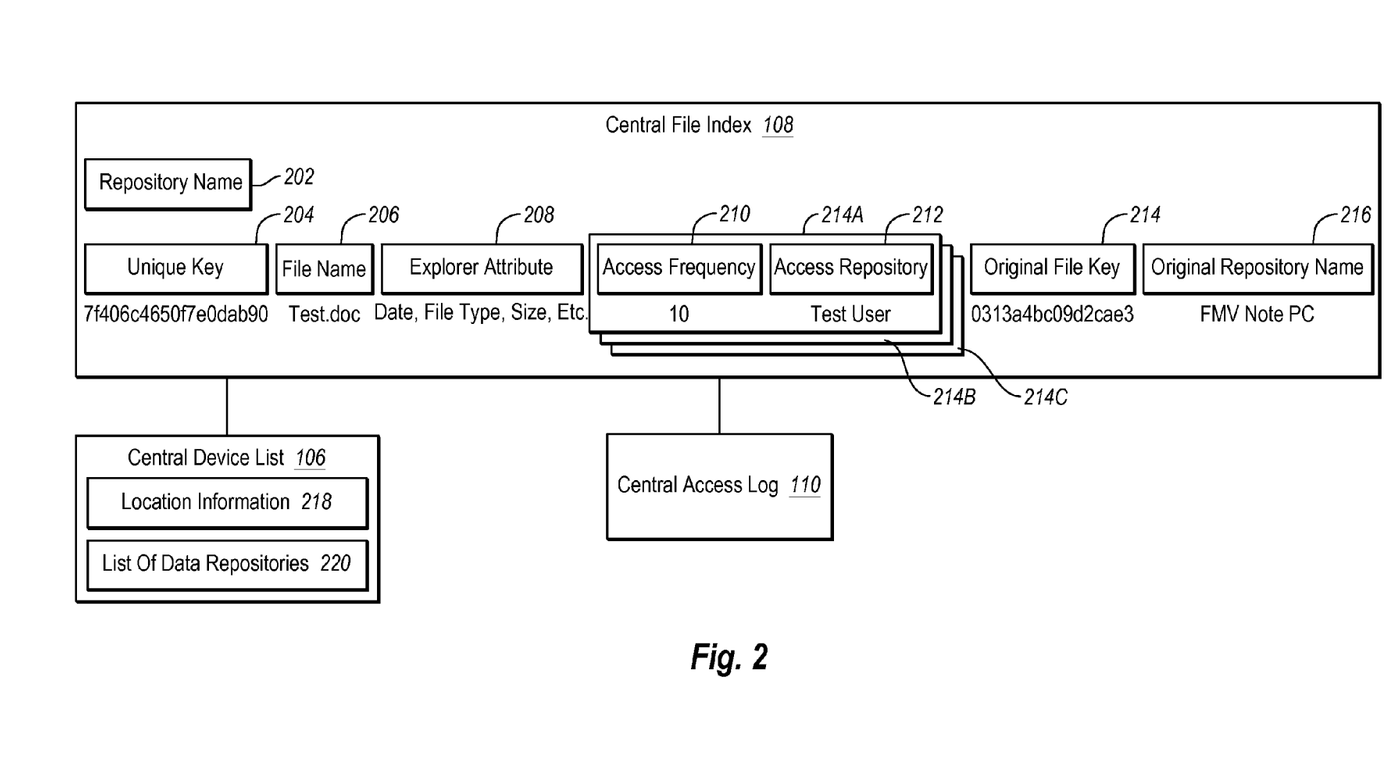
FIG. 2 illustrates an example central file index, an example central device list, and an example central access log, which may be implemented in the distributed file management system of FIGS. 1A and 1B.

FIG. 2 illustrates an example central file index 108, an example central device list 106, and an example central access log 110, which may be implemented in the distributed file management system 100 of FIGS. 1A and 1B. Generally, the central device list 106, the central access log 110, and the central file index 108 communicate information, which may be used to manage files in a distributed file management system. Additionally, when new data repositories are added to the distributed file management system and/or when one or more files are remotely accessed, the information may be communicated among the central device list 106, the central access log 110, and the central file index 108.

With combined reference to FIGS. 1B and 2, the central device list 106 may include a list of the data repositories 220 included in the distributed file management system 100 and location information 218 of each of the files 126A-126G (generally, file or files 126) stored on each of the data repositories 104. For example, the central device list 106 implemented in the distributed file management system 100 may include location information 218 related to the files 126. Specifically, the location information 218 may indicate that a first file 126A, a second file 126B, and a third file 126C are stored on the second data repository 104B; a fourth file 126D and a fifth file 126E are stored on the third data repository 104C; and a sixth file 126F and a seventh file 126G are stored on the fifth data repository 104E (i.e., cloud storage network). Thus, when the first data repository 104A communicates a file access request to the central storage device 102, the central storage device 102 may retrieve the location information 218 for a requested file from the central device list 106.

Additionally, when the new data repository 138 is added to the distributed file management system 100, the new data repository 138 is added to the central device list 106. If one or more files are stored on the new data repository 138, the location information 218 of the files stored on the new data repository 138 are added to the central device list 106.

The central device list 106 may interface with the central file index 108 to communicate information related to the files (e.g., 126 and/or files from the new data repository) and information related to the data repositories (e.g., 104A-104C, 104E and 138) included in or added to the distributed file management system 100.

In some embodiments, the central device list 106 communicates names of the data repositories to populate a repository name column (repository name) 202 in the central file index 108. The central file index 108 may accordingly include an updated list of data repositories 104 that are active in the distributed file management system 100.

Additionally, when the new data repository 138 is added to the distributed file management system 100, original file key 214 and original repository name 216 columns in the central file index 108 may be populated. The original file key 214 is a number assigned to a file 126 by the data repository on which the file 126 is stored. The original repository name 216 is the name of the data repository 104 on which the file 126 was originally stored.

Additionally, each of the files stored on each of the data repositories 104 may be assigned a unique key 204, a file name 206, and one or more explorer attributes 208. The unique key 204 may be a unique alphanumeric identifier for the file 126. The file name 206 is the name of the file 126. The explorer attributes 208 include one or more characteristics of the file 126 on which a search for the file may be based. Some example explorer attributes 208 may include a date the file 126 was created, a file type, or a file size.

For example, a first row of information related to a "test.doc" file is depicted in FIG. 2. The name of the test.doc is "test.doc" which is entered in as the file name 206. The test.doc is assigned a unique key 204 of 7f406c4650f7e0dab90. Some explorer attributes 208 are included for the test.doc. The original file key 214 for the test.doc was 0313a4bc09d2cae3 and the test.doc was originally stored on a data repository named "FMV note PC," which is entered under the original repository name 216.

The central access log 110 may be configured to track remote access to files 126 in the distributed file management system 100. For example, if the test.doc was accessed recently, the central access log 110 may track the data repository 104 or the data repositories 104 from which the test.doc had been remotely accessed or remote access was requested. The central access log 110 may communicate information related to remote access to files 126 to the central file index 108.

In this and other embodiments, the central access log 110 may communicate to the central file index 108 a history of access of the file 126 from each of the data repositories 104. In file management systems 100 including multiple data repositories 104 having the file 126, access to the file 126 from multiple data repositories 104 may be managed in a hierarchical structure. For example, a data repository 104 from which the file 126 is accessed a greater number of times may be managed first, followed by another data repository 104 from which the file 126 is accessed a fewer number of times, etc.

The central file index 108 may compile or track the information communicated by the central access log 110 to calculate access frequencies 210 of the file 126 from one or more access repositories 212. The access repositories 212 are data repositories 104 from which the file 126 has been accessed. The access frequencies 210 may include a number of times a file 126 has been remotely accessed from the access repositories 212. The access frequency 210 and the access repository 212 may be combined into access records 214A-214C. For example, in a first access record 214A the test.doc has been remotely accessed ten times from the first data repository. Additionally, FIG. 2 includes two other access records 214B and 214C indicating that the test.doc has been accessed from two other access repositories 212. The history of access from each of the access repositories 212 may be managed according to a hierarchical structure.

Based on the central file index 108 and/or the information communicated from the central access log 110, the central storage device 102 may generate an optimized redistribution for the files. The optimized redistribution generally includes a proposal or a recommended redistribution of files stored in the data repositories 104 to reduce future remote access. The optimized redistribution may include a set of instructions to be executed by one or more of the data repositories 104 and/or the user 122. For example, if a user is consistently remotely accessing a photo stored on a camera from a mobile device, then the central storage device 102 may propose moving the photo to the mobile device.

In some embodiments, the optimized redistribution is suggested to a user. To execute the optimized redistribution, the user may select or confirm execution of the optimized redistribution or some portion thereof.

Executing the optimized redistribution may include, but are not limited to, deleting unused files from the data repositories 104; copying one or more files to a data repository 104 on which the one or more files are frequently used; moving one or more files to a data repository 104 on which the one or more files are frequently used; or moving one or more files that have not been accessed to low-cost storage. The instructions involved in the optimized redistribution or some subset thereof may be communicated from the central storage device 102 to one or more of the data repositories 104.

The instructions of the optimized redistribution or some subset thereof are received at the data repositories 104. When one or more of the instructions pertains to one or more files locally stored (i.e., stored on the data repository 104 that received the optimized redistribution), the data repository 104 may detect an efficient file access method or an efficient file transfer method to identify a network connection over which to execute one or more of the instructions included in the optimized redistribution. The data repository 104 may then execute the optimized redistribution.

For example, when an instruction included in the optimized redistribution includes moving a first file 126A from the second data repository 104B to the third data repository 104C, the second data repository 104B may analyze current conditions to detect an efficient transfer method which may identify a network connection over which to transfer the first file to the third data repository 104C. In some circumstances, the efficient transfer method may identify a mobile-to-mobile connection as an efficient network connection. Accordingly, the second data repository 104B may then transfer the first file 126A to the third data repository 104C via a mobile-to-mobile connection.

After the instructions of the optimized redistribution are executed, the local file indices 108A-108C are updated. Once updated, the local file indices 108A-108C are communicated to the central storage device 102 to further update the central file index 108, the central access log 110, the central device list 106, or some combination thereof.

Figure 3:
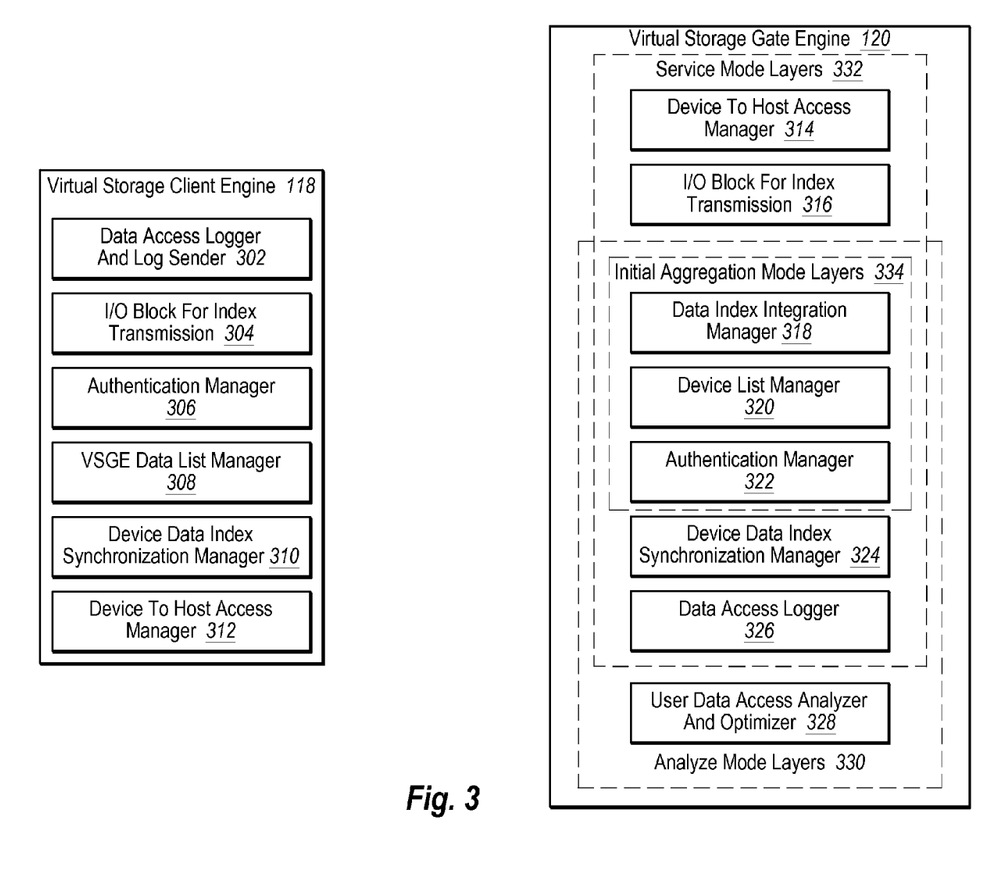
FIG. 3 illustrates example layer diagrams of an example virtual storage client engine and an example virtual storage gate engine that may be included in the distributed file management system of FIGS. 1A and 1B.

FIG. 3 illustrates example layer diagrams of the VSCE 118 and the VSGE 120 that may be included in the distributed file management system 100 of FIGS. 1A and 1B. One or more functions of the VSCE 118 and the VSGE 120 may be categorized according to one or more modes. During each of the modes some subset of layers (314, 316, 318, 320, 322, 324, and 326 or 302, 304, 306, 308, 310, and 312) of the VSCE 118 and the VSGE 120 are operating.

In some embodiments, the VSGE 120 may include an analyze mode during which analyze mode layers 330 may operate. The analyze mode layers 330 may be used when the VSGE 120 is generating optimized redistributions, for instance. The analyze mode layers 330 of the VSGE 120 may include a data index integration manager 318, a device list manager 320, an authentication manager 322, a device data index synchronization manager 324, a data access logger 326, and a user data access analyzer and optimizer 328.

Additionally or alternatively, the VSGE 120 may include a service mode during which service mode layers 332 may operate. The service mode layers 332 may be used when the VSGE 120 is retrieving location information, communicating authentication information, communicating location information, updating a central access log, updating a central device list, updating a central access log, etc. The service mode layers 332 may include a device to host access manager 314, an I/O block for index transmission 316, the data index integration manager 318, the device list manager 320, the authentication manager 322, the device data index synchronization manager 324, and the data access logger 326.

Additionally or alternatively, the VSGE 120 may include an initial aggregation mode during which initial aggregation mode layers 334 may operate. The initial aggregation mode layers 334 may be used when the VSGE 120 is updating a central device list following an addition of a new data repository to a file management system, for instance. The initial aggregation mode layers 334 may include the data index integration manager 318, the device list manager 320, and the authentication manager 322.

The VSCE 118 may include a service mode, an analyze mode, and a receive mode. The VSCE 118 may operate in the service mode when remotely accessing files, communicating with a central storage device, detecting efficient file access methods, updating file lists, etc. The VSCE 118 may operate in the analyze mode when receiving and executing optimized redistributions. The VSCE 118 may operate in the receive mode when receiving authentication information, receiving file access requests from another data repository, and updating and communicating local file lists.

In each of the service mode, the analyze mode, and the receive mode, the VSCE 118 may use one or more layers. Specifically, in this and other embodiments the layers may include a data access logger and log sender 302, an I/O block for index transmission 304, an authentication manager 306, a VSGE data list manager 308, a device data index synchronization manager 310, and a device to host access manager 312.

Figure 4:
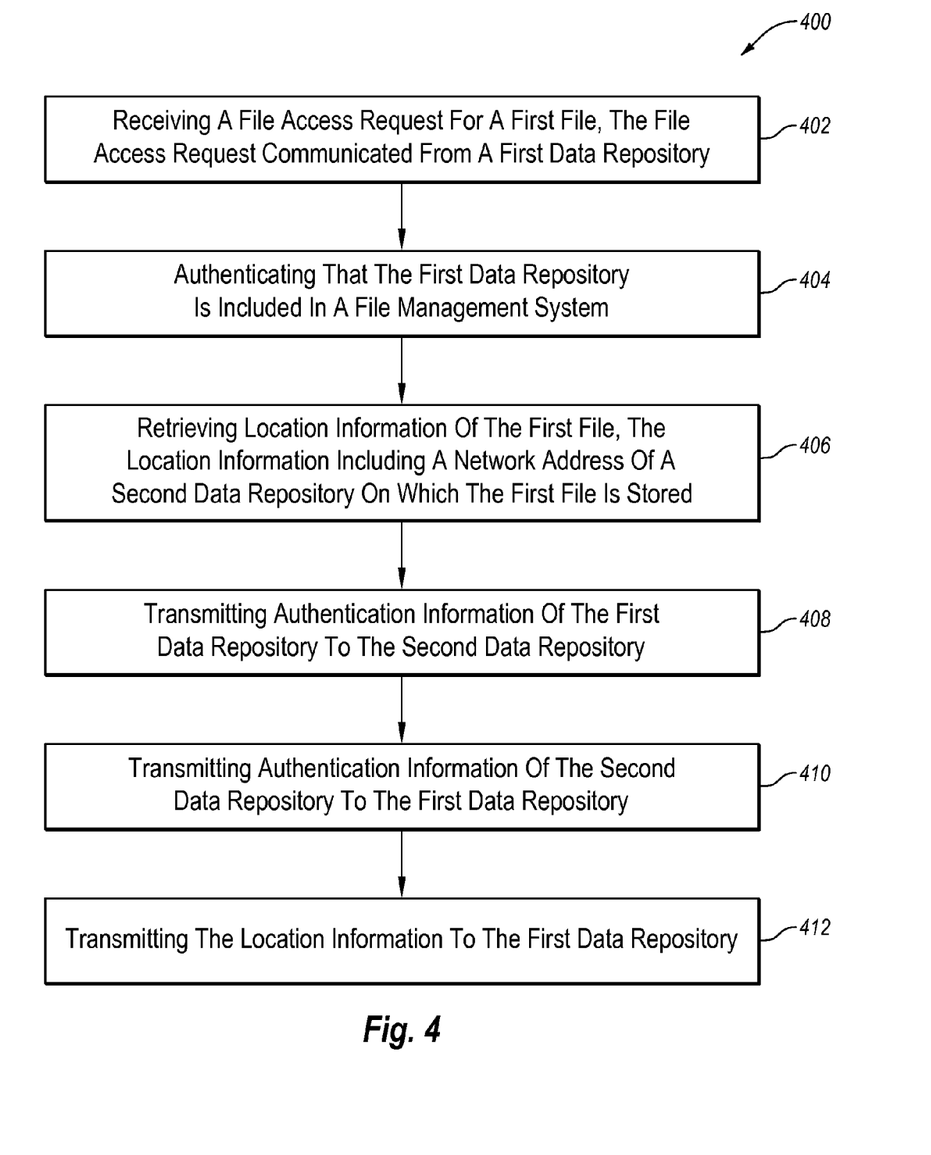
FIG. 4 is a flowchart of an example method that may be implemented in the distributed file management system of FIGS. 1A and 1B.

FIG. 4 is a flowchart of an example method 400 of remotely accessing files in a distributed file management system, arranged in accordance with at least one embodiment described herein. The method 400 may be implemented, in some embodiments, by a system, such as the central storage device 102 of FIGS. 1A and 1B. Although illustrated as discrete blocks, various blocks may be divided into additional blocks, combined into fewer blocks, or eliminated, depending on the desired implementation.

The method 400 may begin at 402 by receiving a file access request for a first file. The file access request may be communicated from a first data repository. At 404, the method 400 may include authenticating that the first data repository is included in a file management system.

At 406, location information of the first file is retrieved. The location information may include a network address of a second data repository on which the first file is stored. The second data repository is also one of the data repositories included in the file management system. The location information may be stored on a central file index or a central device list.

At 408, authentication information of the first data repository is transmitted to the second data repository. The authentication information may indicate that the first data repository is included in the file management system.

At 410, authentication information of the second data repository is transmitted to the first data repository. The authentication information may indicate that the second data repository is included in the file management system.

At 412, the method 400 may include transmitting the location information to the first data repository. The location information may enable the first data repository to remotely access the first file from the second data repository.

In some embodiments, following remote access by the first data repository to the first file, the method 400 may include receiving an updated second repository file index indicating that the first file was accessed on the second data repository by the first data repository. In addition, the method 400 may include synchronizing a central access log to incorporate the updated second data repository file index.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments. For instance, during the remote access by the first data repository to the first file, the method 400 may include locking a second repository file index and the central access log.

In some embodiments, based at least partially on the central access log, the method 400 may include proposing an optimized redistribution of one or more files stored in the file management system. The optimized redistribution may include instructions to delete unused files from the one or more of the data repositories, copy or move one or more files to a data repository on which the one or more files are frequently used, move one or more files that have not been accessed to low-cost storage, or any combination thereof.

In some embodiments, the method 400 may include receiving a registration of a new data repository. After the registration of the new data repository is received, the method 400 may include updating a central device list to include the new data repository. Additionally, file information of one or more files stored on the new data repository may be integrated into a central file index.

Figure 5:
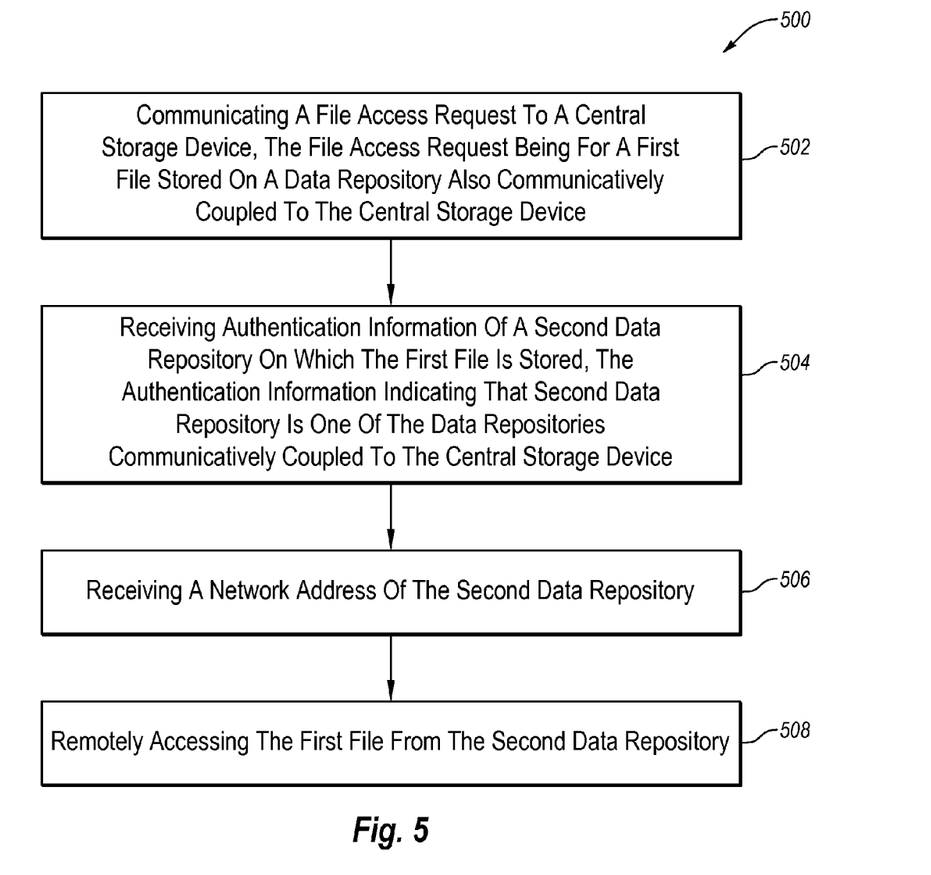
FIG. 5 is a flowchart of another example method that may be implemented in the distributed file management system of FIGS. 1A and 1B, arranged in accordance with at least one embodiment described herein.

FIG. 5 is a flowchart of another example method 500 of remotely accessing files in a distributed file management system, arranged in accordance with at least one embodiment described herein. The method 500 may be implemented, in some embodiments, by a system, such as one or more of the data repositories 104 of FIGS. 1A and 1B. Although illustrated as discrete blocks, various blocks may be divided into additional blocks, combined into fewer blocks, or eliminated, depending on the desired implementation.

At 502, the method 500 may begin by communicating a file access request to a central storage device. The file access request may be for a first file stored on a data repository that is also communicatively coupled to the central storage device.

At 504, the method 500 may include receiving authentication information of a second data repository on which the first file is stored. The authentication information may indicate that the second data repository is one of the data repositories communicatively coupled to the central storage device. At 506, the method 500 may include receiving a network address of the second data repository. At 508, the method 500 may include remotely accessing the first file on the second data repository.

In some embodiments, the first file is remotely accessed via a first network connection and the file access request is communicated to the central storage device via a second network connection. Additionally or alternatively, an efficient file access method may be detected which may identify a network connection over which to access the first file. For example, the network connection may be a connection between data repositories over which the first file may be remotely accessed with a minimum amount of time and/or allocation of other data transfer resources. In some embodiments, the network connection identified by the efficient file access method may be the first network connection over which the first file is accessed.

In some embodiments, the method 500 may include executing an optimized redistribution as instructed by the central storage device. The optimized redistribution may pertain to one or more locally stored files. In addition, executing the optimized redistribution may include copying or moving one or more locally stored files to another data repository on which the one or more locally stored files are frequently used. In these and other embodiments, the method 500 may further include detecting an efficient file transfer method, which may identify a network connection for communicating one or more locally stored files to the other data repository. In these and other embodiments, the optimized redistribution may occur via the network connection identified by the efficient file transfer method. Additionally or alternatively, following execution of the optimized redistribution, the method 500 may include updating a local file index and communicating the updated local file index to the central storage device.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which may be used to carry or store desired program code means in the form of computer-executable instructions or data structures and which may be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A distributed file management system that is implemented for a user who is associated with each of a plurality of data repositories, the distributed file management system comprising:
   a central storage device communicatively coupled to the plurality of data repositories that are configured to store one or more files, the central storage device including a processor and a tangible computer-readable storage medium communicatively coupled to the processor, the tangible computer-readable storage medium having computer-executable instructions stored thereon that are executable by the processor to perform operations including:
   receiving a file access request from a first data repository, the file access request including a request for a file;
   authenticating the first data repository as one of the plurality of data repositories included in the file management system;
   transmitting authentication information of the first data repository to a second data repository on which the file is stored, the authentication information of the first data repository indicating that the first data repository is one of the plurality of data repositories, the first data repository is a secured device, and remote access by the first data repository does not introduce vulnerabilities;
   transmitting authentication information of the second data repository to the first data repository, the authentication information of the second data repository indicating that the second data repository is one of the plurality of data repositories, the second data repository is a secured device, and remote access to the second data repository does not introduce vulnerabilities;
   transmitting, to the first data repository, location information of the file requested in the file access request, the location information including an internet protocol (IP) address of the second data repository on which the file is stored and enabling direct access to the file by the first data repository;
   receiving updated file indices from the first and the second data repositories indicating remote access to the file at the IP address by the first data repository; and
   updating a central access log and a central file index to include the updated file indices.

2. The distributed file management system of claim 1, wherein the central access log is configured to store historical file access patterns and to track file access requests.

3. The distributed file management system of claim 1, wherein the operations further include determining an optimized redistribution for one or more of the files based at least partially on the central access log.

4. The distributed file management system of claim 3, wherein execution of the optimized redistribution includes:
   deleting one or more unused files;
   moving one or more files to data repositories on which the one or more files are frequently used;
   copying one or more files to data repositories on which the one or more files are frequently used; or
   moving one or more files that have not been accessed to a low-cost storage device.

5. The distributed file management system of claim 1, wherein the central storage device includes a central device list in which the location information of the files is stored.

6. The distributed file management system of claim 1, wherein the operations further include locking the central access log and the central file index during remote access to the file.

7. The distributed file management system of claim 1, wherein receiving updated file indices includes synchronizing with the first and the second data repositories at a predefined interval or following the remote access to the file.

8. The distributed file management system of claim 1, wherein the plurality of data repositories include a mobile device, a tablet personal computer, a camera, and a cloud storage network.

9. A method comprising:
   receiving, from a first data repository, a file access request for a first file, the file access request including authentication information of the first data repository;
   authenticating, based on the received authentication information, the first data repository as one of a plurality of data repositories included in a file management system that is implemented for a user who is associated with each of the plurality of data repositories;
   retrieving location information of the first file, the location information including a network address of a second data repository that is one of the plurality of data repositories on which the first file is stored;
   transmitting authentication information of the first data repository to the second data repository, the authentication information of the first data repository indicating that the first data repository is one of the plurality of data repositories, the first data repository is a secured device, and remote access to the first data repository does not introduce vulnerabilities;
   transmitting authentication information of the second data repository to the first data repository, the authentication information of the second data repository indicating that the second data repository is one of the plurality of data repositories, the second data repository is a secured device, and remote access to the second data repository does not introduce vulnerabilities; and
   transmitting the location information to the first data repository, the location information enabling direct access to the first file at the network address by the first data repository.

10. The method of claim 9, further comprising:
following remote access by the first data repository to the first file:
receiving an updated second repository file index indicating that the first file was accessed on the second data repository by the first data repository; and
synchronizing a central access log to incorporate the updated second repository file index.

11. The method of claim 10, further comprising during the remote access by the first data repository of the first file, locking a second local file index and the central access log.

12. The method of claim 10, further comprising:
based at least partially on the central access log, determining an optimized redistribution of files stored in the file management system, wherein execution of the optimized redistribution includes:
deleting unused files from the plurality of data repositories;
copying one or more files to a data repository on which the one or more files are frequently used;
moving one or more files to a data repository on which the one or more files are frequently used; or
moving one or more files that have not been accessed to low-cost storage.

13. The method of claim 9, further comprising:
receiving a registration of a new data repository;
updating a central device list to include the new data repository; and
integrating file information of one or more files stored on the new data repository into a central file index.

14. A non-transitory computer-readable storage medium having computer instructions stored thereon that are executable by a processing device to perform the method of claim 9.

15. One or more processors configured to execute computer instructions to cause one or more computing systems to perform operations for remotely accessing files in a distributed file management system that is implemented for a user who is associated with each of a plurality of data repositories, the operations comprising:
communicating a file access request to a central storage device, the file access request being for a first file stored on one of the plurality of data repositories that are also communicatively coupled to the central storage device;
receiving a network address of a second data repository;
receiving authentication information of the second data repository on which the first file is stored, the authentication information indicating that the second data repository is one of the plurality of data repositories, the second data repository is a secured device, and remote access to the second data repository does not introduce vulnerabilities;
and
in response to the received authentication information, remotely accessing the first file on the second data repository at the received network address of the second data repository.

16. The one or more processors of claim 15, wherein remotely accessing the first file is via a first network connection and the file access request is communicated to the central storage device via a second network connection.

17. The one or more processors of claim 16, wherein the operations further comprise detecting an efficient file access method to identify a network connection over which to remotely access the first file, wherein the first network connection is the network connection identified by the efficient file access method.

18. The one or more processors of claim 15, wherein the operations further comprise:
executing an optimized redistribution as instructed by the central storage device, the optimized redistribution pertaining to a file that is locally stored and when executed includes copying or moving the locally stored files to another data repository on which the locally stored files is frequently used.

19. The one or more processors of claim 18, wherein the operations further comprise detecting an efficient file transfer method to identify a network connection for communicating the locally stored file to the other data repository, and wherein executing the optimized redistribution occurs via the network connection identified by the efficient file transfer method.

20. The one or more processors of claim 19, wherein the operations further comprise:
updating a local file index following execution of the optimized redistribution; and
communicating the updated local file index to the central storage device.

* * * * *